United States Patent Office 3,711,502
Patented Jan. 16, 1973

---

3,711,502
N-TRITYL-IMIDAZOLIUM SALT
Karl Heinz Buchel, Wuppertal-Elberfeld, Ferdinand Grewe, Burscheid, Hans Scheinpflug and Helmut Kaspers, Leverkusen, and Erik Regel, Wuppertal-Kronemberg, Germany, assignors to Farbenfabriken Bayer Aktiengesellschaft, Leverkusen, Germany
No Drawing. Original application Jan. 7, 1969, Ser. No. 789,602. Divided and this application May 15, 1970, Ser. No. 37,934
Int. Cl. C07d 49/36
U.S. Cl. 260—309       1 Claim

ABSTRACT OF THE DISCLOSURE

N-trityl-imidazolium salts of the formula:

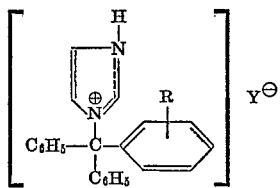

wherein R is hydrogen or halo and Y is the anion of an inorganic or organic acid and are useful against fungi pathogenic to plants.

---

This is a divisional of our co-pending application Ser. No. 789,602, filed Jan. 7, 1969, now abandoned.

The present invention relates to and has for its objects the provision for particular new N-trityl-imidazolium salts of inorganic and organic acids, i.e. N-triphenylmethyl- and 1 - [(halophenyl)-(bisphenyl)-methyl]-imidazolium salts of inorganic and organic acids, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is already known that certain N-trityl-imidazoles exhibit fungicidal properties (compare U.S. Pat. 3,321,366).

It has been found in accordance with the present invention, that the particular new N-trityl-imidazolium salts of the formula

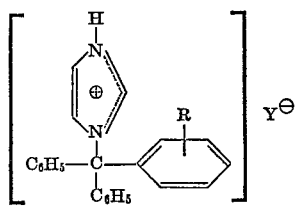

in which

R is hydrogen or halo, and
Y is the anion of an inorganic or organic acid, exhibit strong fungicidal properties.

In our copending U.S. application, Ser. No. 789,601, filed Jan. 7, 1969, now abandoned, N-trityl-imidazoles, rather than N-trityl-imidazolium salts of the instant type, are disclosed and claimed which also possess superior fungicidal properties.

The invention also provides a process for the production of such new N-trityl-imidazolium salts of Formula I above in which a trityl-imidazole of the formula

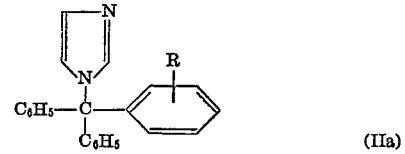

in which R is the same as defined above, is reacted with an inorganic or an organic acid(IIb).

It is very surprising that the N-trityl-imidazolium salts of the present invention exhibit a considerably greater fungicidal activity than previously known tritylimidazoles. The instant active compounds therefore represent a valuable enrichment of the art.

The production reaction according to the present invention is illustrated by the following typical equation:

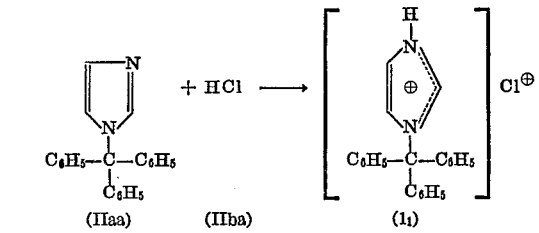

Advantageously, in accordance with the present invention, in the various formulae set forth herein:

R represents
  hydrogen, or
  halo such as chloro, fluoro, bromo and iodo, including ortho, meta and para halo, especially ortho, meta and para chloro and fluoro; and
Y is the anion of an:
  inorganic acid, i.e. mineral acid, such as a hydrohalide including hydrochloric, hydrofluoric, hydrobromic and hydroiodic; sulfuric acid; orthophosphoric acid; nitric acid; and the like, especially mono- and poly-basic inorganic acids, such as mono- to tri-basic inorganic acids, preferably halides and particularly chloride; or
  organic acid including
    aliphatic carboxylic acids, e.g. lower aliphatic hydrocarbon carboxylic acid, especially having 2–8 carbon atoms, such as mono- and poly-carboxylic, including mono- to tri-carboxylic, saturated and unsaturated, e.g. mono- and diethylenically unsaturated, optionally mono- and poly-, especially mono- to tri-, hydroxy-substituted, acids; including
      lower alkanoic, especially $C_{2-8}$ or $C_{2-6}$ alkanoic, acids such as acetic, propionic, butyric, pentanoic, hexanoic, heptanoic, octanoic, and the like, acids;
      lower alkanedioic, especially $C_{3-8}$ or $C_{3-6}$ alkanedioic, acids, such as malonic
        [HOOC—$CH_2$—COOH]
      succinic [HOOC—$(CH_2)_2$—COOH], glutaric [HOOC—$(CH_2)_3$—COOH], adipic [HOOC—$(CH_2)_4$—COOH], pimelic
        [HOOC—$(CH_2)_5$—COOH]
      suberic [HOOC—$(CH_2)_6$—COOH], and like, acids;
      lower alkanetricarboxylic acids, especially $C_{5-8}$ or $C_{6-8}$ alkanetricarboxylic, acids such as tricarballylic
        [(HOOC—$CH_2)_2$—CH—COOH]
      and the like, acids;

lower alkenoic, especially $C_{3-8}$ or $C_{3-6}$ alkenoic, acids such as acrylic $$[CH_2=CH-COOH]$$

crotonic $[CH_3-CH=CH-COOH]$, methacrylic $[CH_2=C(CH_3)-COOH]$, vinylacetic $[CH_2=CH-CH_2-COOH]$, pent- -2-, -3- and -4- -enoic, hex- -2-, -3-, -4- and -5- -enoic, pyroterebic $$[(CH_3)_2-C=CH-CH_2-COOH]$$

and the like, acids;
lower alkadienoic, especially $C_{5-8}$ or $C_{5-6}$ alkadienoic, acids such as sorbic $$[CH_3(-CH=CH-)_2-COOH]$$

and the like, acids;
lower alkenedioic, especially $C_{4-8}$ or $C_{4-6}$ alkenedioic, acids such as maleic $$[cis\ HOOC-CH=CH-COOH]$$

fumaric $$[trans\ HOOC-CH=CH-COOH]$$

citraconic $$[HOOC-C(CH_3)=CH-COOH]$$

allylmalonic $$[CH_2=CH-CH_2-CH(COOH)_2]$$

and the like, acids;
lower alkadienedioic, especially $C_{5-8}$ or $C_{5-6}$ alkadienedioic, acids such as muconic $$[HOOC-CH=CH-CH=CH-COOH]$$

and the like, acids; and
hydroxy-substituted lower, e.g. $C_{2-8}$ or $C_{2-6}$ or $C_{2-4}$, alkanoic, hydroxy-substituted lower, e.g. $C_{3-8}$ or $C_{3-6}$ alkanedioic, and hydroxy-substituted lower, e.g. $C_{5-8}$ or $C_{6-8}$ alkanetricarboxylic, acids such as glycollic $[HO-CH_2-COOH]$, lactic $$[CH_3-CH(OH)-COOH]$$

malic $$[HOOC-CH_2-CH(OH)-COOH]$$

tartaric $$[HOOC-CH(OH)-CH(OH)-COOH]$$

citric $$[HOOC-CH_2-C(OH)(COOH)-CH_2-COOH]$$

and the like, acids, especially mono- to trihydroxy alkan mono- to tri-oic acid; and
aromatic mono- and poly-carboxylic acids including $C_{6-10}$ aryl hydrocarbon carboxylic acids, e.g. aromatic or $C_{6-10}$ aryl mono- to tricarboxylic acids, optionally mono- and poly-, e.g. mono- to tri-, hydroxy substituted, especially benzene mono- and poly-, e.g. mono- to tri-, carboxylic acids, optionally mono- and poly-, e.g. mono- to tri-, hydroxy substituted, including benzene monocarboxylic acid, i.e. benzoic acid;
benzene dicarboxylic acids, such as phthalic, isophthalic and terephthalic acids, i.e. ortho, meta and para dicarboxyl benzene;
benzene tricarboxylic acids such as hemimellitic, mellitic and trimesic acids, i.e. 1,2,3-, 1,2,4- and 1,3,5-tricarboxyl benzene; and the like,
monohydroxy-benzene monocarboxylic acids such as salicylic acid, i.e. orthohydroxybenzene monocarboxylic acid, as well as meta and para hydroxy-benzene monocarboxylic acid, and the like;
dihydroxy - benzene monocarboxylic acids such as 5-hydroxyl salicylic acid (gentistic acid), i.e. 2,5-dihydroxy-benzoic acid, resorcylic acid, i.e. 3,5-, 2,4- and 2,6-dihydroxy-benzoic acid, and the like;
trihydroxy - benzene monocarboxylic acids such as pryogallol carboxylic acid, i.e. 2,3,4-trihydroxy benzoic acid, and the like;
monohydroxy - benzene dicarboxylic acids such as hydroxy phthalic, isophthalic and terephthalic acids, i.e. 4-hydroxy-1,2-dicarboxyl benzene, 3-hydroxy-1,2-dicarboxyl benzene, 2-hydroxy-1,3 - dicarboxyl benzene, 4-hydroxy-1,3-dicarboxyl benzene, 5-hydroxy-1,3-dicarboxy benzene, 2-hydroxy-1,4-dicarboxyl benzene, and the like;
dihydroxy-benzene dicarboxylic acids such as 3,4- and 3,5-dihydroxy-1,2-dicarboxyl benzene, 2,4- and 2,5-dihydroxy-1,3-dicarboxyl benzene, 2,3- and 2,5-dihydroxy-1,4-dicarboxyl benzene, and the like;
trihydroxy-benzene dicarboxylic acids such as 3,4,5-trihydroxy-1,2-dicarboxylbenzene, 2,4,5-trihydroxy-1,3-dicarboxyl benzene, 2,3,5-trihydroxy-1,4-dicarboxyl benzene and the like;
monohydroxy-benzene tricarboxylic acids such as 4- and 5-hydroxy-1,2,3-tricarboxyl benzene, 3- and 5-hydroxy-1,2,4-tricarboxyl benzene, 2-hydroxy-1,3,5-tricarboxyl benzene, and the like;
dihydroxy-benzene tricarboxylic acids such as 4,5-dihydroxy - 1,2,3-tricarboxyl benzene, 3,6-dihydroxy - 1,2,4-tricarboxyl benzene, 2,4-dihydroxy - 1,3,5-tricarboxyl benzene, and the like; and
trihydroxy-benzene tricarboxylic acids such as 4,5,6-trihydroxy-1,2,3-tricarboxyl benzene, 3,5,6-trihydroxy - 1,2,4-tricarboxyl benzene, 2,4,6-trihydroxy-1,3,5-tricarboxyl benzene, and the like.

Preferably, R is hydrogen or halo, especially chloro or fluoro; and Y is the halo anion, especially chloro; or the anion of $C_{2-8}$ or $C_{2-6}$ alkanoic acid, especially acetic acid; or $C_{3-8}$ or $C_{3-6}$ alkanedioic acid, especially monosuccinic acid; or $C_{4-8}$ or $C_{4-6}$ alkanedioic acid, especially mono-maleic acid; or $C_{5-8}$ or $C_{5-6}$ alkedienoic acid, especially sorbic acid; or hydroxy-$C_{2-8}$ or $C_{2-6}$ alkanoic acid, especially lactic acid; or hydroxy-$C_{5-8}$ or $C_{6-8}$ alkanetricarboxylic acid, especially mono-citric acid; or dihydroxy-$C_{3-8}$ or $C_{3-6}$ alkanedioic acid, especially tartaric acid; and the like.

In particular, where R is halo, especially chloro or fluoro, Y is the chloro anion or the anion of an hydroxy-$C_{2-6}$ alkanoic acid, especially the anion of lactic acid.

The N-trityl-imidazoles useable as starting materials are clearly characterized by the Formula IIa above.

Some of the trityl-imidazole starting materials are known, for example trityl-imidazole and 1-[(p-chlorophenyl)-(bisphenyl)-methyl]-imidazole. Those which are new can be prepared in the same manner as those which are known.

The starting N-trityl-imidazoles of the Formula IIa are obtained in particularly favorable manner when the appropriate starting trityl-halide is reacted with imidazole in a polar inert organic solvent, such as acetonitrile, dimethyl formamide or nitromethane, at a temperature of from 0 to 100° C. in the presence of an acid binder, such as triethylamine or pyridine.

Trityl chloride is already known. Some of the monosubstituted starting tritylhalides are known. Those starting tritylhalides which are new can be prepared in the same manner as the known ones.

The preparation of the mono-substituted trityl chlorides may be carried out as follows:

The Grignard compound of the mono-substituted benzene is prepared. The phenylmagnesium bromide so obtained is then reacted with benzophenone. The organometallic complex compound obtained is subjected to hydrolysis, the appropriate alcohol being formed (compare J. Org. Chem. 7, 392 (1942)).

The chloride may be easily prepared from the alcohol, when the alcohol is reacted with anhydrous hydrogen chloride or with thionyl chloride. The hydroxyl group is replaced by chlorine (compare J. Org. Chem. 7, 392 (1942)).

The acids usable as starting materials for the process according to the invention are of course also known and include inorganic monobasic or polybasic acids, or organic aliphatic mono- or poly-carboxylic acids which may be saturated or unsaturated, or aromatic mono- or poly-carboxylic acids. These organic acids may be substituted, preferably by one or more hydroxyl groups.

It is preferable to use acids which are not phytotoxic. As is known, some very specific organic acids have a phytotoxic activity. These include the substituted phenoxyacetic acids, phenoxypropionic acids and phenoxybutyric acids, such as 2,4-dichlorophenoxy-acetic acid and 2-methyl-4-chloro-phenoxy-propionic acid.

Particularly suitable acids, for example, include: hydrochloric acid, hydrofluoric acid, sulfuric acid, phosphoric acid, nitric acid, acetic acid, glycollic acid, lactic acid, malonic acid, succinic acid, glutaric acid, adipic acid, sorbic acid, pyroterebic acid, fumaric acid, maleic acid, citric acid, citraconic acid, tartaric acid, malic acid, muconic acid, allylmalonic acid, benzoic acid, salicylic acid, and the like.

The production reaction according to the present invention may be carried out in the presence of solvents, which term includes mere diluents.

These solvents and diluents include especially the chlorinated hydrocarbons, such as chlorobenzene and carbon tetrachloride; ethers, such as diethyl ether, dioxan and tetrahydrofuran; nitriles, such as acetonitrile; amides, such as dimethyl formamide; and sulfoxides, such as dimethyl sulfoxide; and the like. It is expedient to use strongly polar solvents which dissolve both reaction components as completely as possible. Aqueous diluents are less suitable since losses may occur because of hydrolytic splitting up of the N-trityl compound.

The reaction temperatures which may be used can be varied within a fairly wide range. In general, the reaction is carried out at substantially between about −10 to 60° C., preferably between about 0 to 50° C.

When carrying out the reaction, about one mol of acid is normally used for each mol of imidazole, i.e. whereby to form the equivalent salt. The reactants are suitably mixed in a solvent which, after the reaction, is evaporated off wholly or in part. It is often expedient to add ether to promote crystallization.

Advantageously, the particular new active compounds of the present invention exhibit a strong fungitoxic activity. Because of their low toxicity to warm-blooded animals the instant compounds are suitable for the control of undesired fungus growth. Their good compatibility with higher plants permits the instant compounds to be used as plant protection agents against fungal plant diseases.

The instant active compounds are particularly suitable for the control of phytopathogenic fungi on above-the-soil parts of plants as well as against phytopathogenic fungi which attack the plants from the soil.

The instant active compounds exhibit a particularly high fungicidal potency against powdery mildew fungi from the family of the Erysiphaceae, for example against the fungi of the genera Erysiphe, Oidium and Podoshaera; and the like. The instant active compounds can, however, also be used with good results for the control of other phytopathogenic fungi, for example fungi which cause diseases in rice and ornamental plants. The instant active compounds show a good activity against *Piricularia oryzae*, *Pellicularia sasakii* and *Cochliobolus miyabeanus*, three pathogenic agents which occur in rice; and against *Cercospora musae*; and the like. Furthermore, the growth of *Phialosphora cinerescens*, a fungus which attacks carnations from the soil, is also inhibited.

The instant active compounds are distinguished by a high effectiveness in very low concentrations and by a good compatibility with plants. For this reason, dosages higher than necessary for the fungicidal effect can be accepted readily by such plants.

The active compounds according to the instant invention can be utilized, if desired, in the form of the usual formulations or compositions with inert conventional pesticidal diluents or extenders, i.e. inert conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers, optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polygylcol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspension, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, where as carrier composition mixtures suitable for direct application or field application generally contemplate those in which the active compound is present in an amount substantially between about 0.00001–2%, preferably 0.0001–1%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.00001–95%, and preferably 0.0001–95%, by weight of the mixture.

The active compound can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing 10–80%, preferably 20–60%, or generally from about 20 to about 95% by weight of the active compound, or even the 100% active substance alone, e.g. about 10–100% by weight of the active compound.

In particular, the present invention contemplates methods of selectively killing, combating or controlling fungi, which comprises applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the new compounds of the present invention is illustrated, without limitation, by the following examples.

EXAMPLE 1

Podosphaera test (powdery mildew of apples) [Protective]

Solvent: 4.7 parts by weight acetone
Emulsifier: 0.3 part by weight alkylaryl polyglycol ether
Water: 95.0 part by weight The amount of the particular active compound required for the desired concentration of such active compound in the spray liquid is mixed with the stated amount of solvent, and the resulting concentrate is diluted with the stated amount of water which contains the stated emulsifier.

Young apple seedlings in the 4–6 leaf stage are sprayed (treated) with the active compound spray liquid until dripping wet. The plants remain in a greenhouse for 24 hours at 20° C. and at a relative atmospheric humidity of 70%. Such plants are then inoculated by dusting with conidia of the apple powdery mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation, and 100% means that the infestation is exactly as great as in the case of the control plants.

The particular active compounds tested, their concentrations and the results obtained can be seen from the following Table 1.

TABLE 1.—PODOSPHAERA TEST (PROTECTIVE)

| Active compound | | Infestation as a percentage of the infestation of the untreated control with a concentration of active compound (in percent) of— | |
|---|---|---|---|
| | | 0.0031 | 0.00156 |
| Known: | | | |
| (A) | 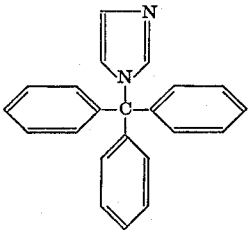 | 58 | 65 |
| (B) | 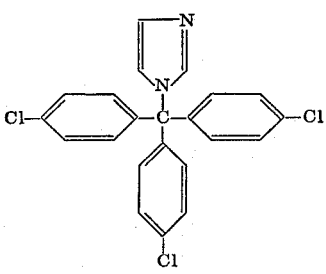 | 98 | 98 |

Active compounds according to the invention: corresponding to Formula I in which R is H and Y has the following meaning, respectively:

| | | | |
|---|---|---|---|
| ($1_1$) | $Cl^\ominus$ | 40 | 43 |
| ($2_1$) | $CH_3\overset{\underset{\mid}{OH}}{C}H\text{—}COO^\ominus$ | | |
| ($3_1$) | $\begin{matrix}COOH\\ \mid\\ CH\\ \parallel\\ CH\\ \mid\\ COO^\ominus\end{matrix}$ | | |
| ($4_1$) | $\begin{matrix}COO^\ominus\\ \mid\\ CHOH\\ \mid\\ CHOH\\ \mid\\ COOH\end{matrix}$ | 50 | 41 |
| ($5_1$) | $\begin{matrix}CH_2\text{—}CO_2H\\ \mid\\ HO\text{—}C\text{—}CO_2{}^\ominus\\ \mid\\ CH_2\text{—}CO_2H\end{matrix}$ | 38 | 39 |
| ($6_1$) | $CH_3CO_2{}^\ominus$ | 56 | 55 |
| ($7_1$) | 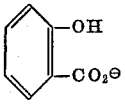 | 28 | 34 |
| ($8_1$) | $\begin{matrix}CH_3\\ \mid\\ CH\\ \parallel\\ CH\\ \mid\\ CH\text{=}CH\text{—}CO_2{}^\ominus\end{matrix}$ | ----- | 36 |
| ($9_1$) | $\begin{matrix}CO_2H\\ \mid\\ CH_2\\ \mid\\ CH_2\\ \mid\\ CO_2{}^\ominus\end{matrix}$ | ----- | 53 |

EXAMPLE 2

Example 1 was repeated using the compounds and obtaining the results given in Table 2 below.

TABLE 2.—PODOSPHAERA TEST (PROTECTIVE)

| | | | Infestation as a percentage of the infestation of the untreated control with a concentration of active compound (in percent) of— | |
|---|---|---|---|---|
| Active compound | | | 0.0031 | 0.00156 |
| Active compound corresponding to Formula I in which R and Y have the following meaning, respectively: | | | | |
| | Y | R | | |
| ($10_1$) | $Cl^\ominus$ | o-Cl | 0 | 3 |
| ($11_1$) | $CH_3$<br>$\underset{\underset{CO_2^\ominus}{\vert}}{\overset{\vert}{CHOH}}$ | o-F | 0 | 2 |
| ($12_1$) | $CH_3$<br>$\underset{\underset{CO_2^\ominus}{\vert}}{\overset{\vert}{CHOH}}$ | m-F | 5 | 16 |
| ($13_1$) | $Cl^\ominus$ | p-F | 18 | 15 |
| ($14_1$) | $CH_3$<br>$\underset{\underset{CO_2^\ominus}{\vert}}{\overset{\vert}{CHOH}}$ | p-F | 21 | 18 |
| ($15_1$) | 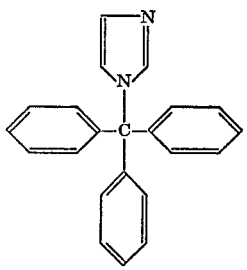 | p-F | 5 | 15 |
| ($16_1$) | $CH_3$<br>$\underset{\underset{CO_2^\ominus}{\vert}}{\overset{\vert}{CHOH}}$ | p-Cl | 31 | 31 |
| ($17_1$) | $Cl^\ominus$ | m-Cl | 0 | 9 |
| ($18_1$) | $CH_3$<br>$\underset{\underset{CO_2^\ominus}{\vert}}{\overset{\vert}{CHOH}}$ | m-Cl | 0 | 16 |

EXAMPLE 3

Erysiphe test

Solvent: 4.7 parts by weight acetone
Emulsifier: 0.3 part by weight alkylaryl polyglycol ether
Water: 95.0 parts by weight The amount of the particular active compound required for the desired concentration in the spray liquid is mixed with the stated amount of the solvent, and the resulting concentrate is diluted with the stated amount of water containing the stated emulsifier.

Young cucumber plants (Delikatess variety) with about three foliage leaves are sprayed (treated) with the active compound spray liquid until dripping wet. The cucumber plants remain in a greenhouse for 24 hours to dry. Such plants are then, for the purpose of inoculation, dusted with conidia of the fungus *Erysiphe polyphaga*. The plants are subsequently placed in a greenhouse at 23–24° C. and at a relative atmospheric humidity of about 75%.

After 12 days, the infestation of the cucumber plants is determined as a percentage of the untreated but also inoculated control plants. 0% means no infestation, and 100% means that the infestation is exactly as great as in the case of the control plants.

The particular active compounds tested, their concentrations and the results obtained can be seen from the following Table 3.

TABLE 3.—ERYSIPHE TEST

| Active compound | | Infestation as a percentage of the infestation of the untreated control with a concentration of active compound (in percent) of 0.00019 |
|---|---|---|
| Known: | | |
| (A) | 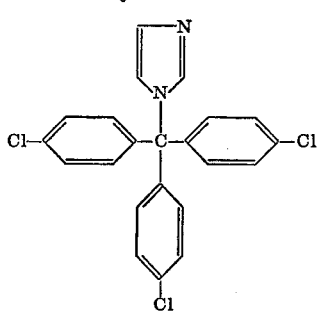 | 35 |
| (B) | 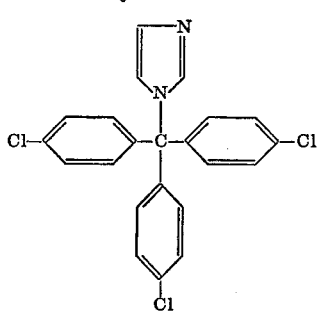 | 100 |
| Active compounds according to the invention: corresponding to Formula I in which R is H and Y has the following meaning, respectively: | | |
| ($1_2$) | $Cl^\ominus$ | 15 |
| ($2_2$) | $\underset{\underset{}{}}{\overset{OH}{\vert}}$<br>$CH_3CH-COO^\ominus$ | 0 |
| ($3_2$) | $\underset{\underset{\underset{COO^\ominus}{\vert}}{\overset{\Vert}{CH}}}{\overset{COOH}{\vert}}$<br>$CH$ | 10 |
| ($4_2$) | $\underset{\underset{\underset{COOH}{\vert}}{\overset{\vert}{CHOH}}}{\overset{COO^\ominus}{\vert}}$<br>$CHOH$ | 10 |
| ($5_2$) | $\underset{\underset{CH_2-CO_2H}{\vert}}{\overset{CH_2-CO_2H}{\vert}}$<br>$HO-C-CO_2^\ominus$ | 10 |
| ($6_2$) | $CH_3CO_2^\ominus$ | 20 |
| ($7_2$) | 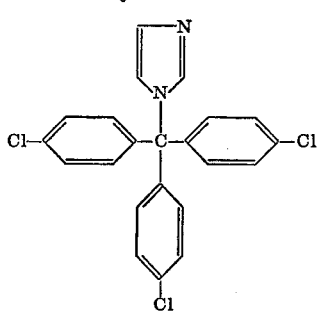 | 15 |
| ($8_2$) | $CH_3$<br>$\underset{\underset{CH=CH-CO_2^\ominus}{\vert}}{\overset{\Vert}{CH}}$ trans | 3 |
| ($9_2$) | $\underset{\underset{\underset{CO_2^\ominus}{\vert}}{\overset{\vert}{CH_2}}}{\overset{CO_2H}{\vert}}$<br>$CH_2$ | 3 |

EXAMPLE 4

Example 3 was repeated using the compounds and obtaining the results given in Table 4 below:

TABLE 4.—ERYSIPHE TEST

| | Active compound | | Infestation as a percentage of the infestation of the untreated control with a concentration of active compound (in percent) of 0.00019 |
|---|---|---|---|
| | Active compounds corresponding to Formula I, in which R and Y have the following meaning, respectively: | | |
| | Y | R | |
| (11₂) | CH₃—CHOH—CO₂⁻ | o-F | 0 |
| (12₂) | CH₃—CHOH—CO₂⁻ | m-F | 7 |
| (14₂) | CH₃—CHOH—CO₂⁻ | p-F | 10 |
| (16₂) | CH₃—CHOH—CO₂⁻ | p-Cl | 20 |
| (17₂) | Cl⁻ | m-Cl | 0 |
| (18₂) | CH₃—CHOH—CO₂⁻ | m-Cl | 0 |

EXAMPLE 5

Mycelium growth test

Nutrient medium used:

| | Parts by wt. |
|---|---|
| Agar-agar | 20 |
| Malt extract | 30 |
| Distilled water | 950 |

Proportion of solvent to nutrient medium:

| | Parts by wt. |
|---|---|
| Acetone | 2 |
| Agar nutrient medium | 100 |

The amount of the particular active compound required for the desired concentration of such active compound in the nutrient medium is mixed with the stated amount of solvent. The resulting concentrate is thoroughly mixed, in the stated proportion, with the liquid nutrient medium (which has been cooled to 42° C.) and is then poured into Petri dishes of 9 cm. diameter. Control dishes to which the active compound preparation has not been added are also set up.

When the nutrient medium has cooled and solidified, the dishes are inoculated with the species of fungi stated in the table below and incubated at about 21° C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control.

The particular active compounds tested, their concentrations and the results obtained can be seen from the following Table 5.

TABLE 5.—MYCELIUM GROWTH TEST

| Active compound | Concentration of active compound in p.p.m. | Piricularia oryzae | Philaophora cinerescens | Pellicularia sasakii | Cercospora musae | Cochliobusmiya beanus |
|---|---|---|---|---|---|---|
| Known: | | | | | | |
| (B) 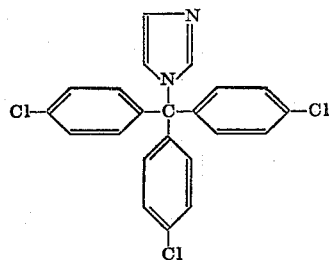 | 10 | 4 | 4 | 4 | 4 | 4 |
| Active compounds according to the invention: corresponding to Formula I in which R is H and Y has the following meaning, respectively: | | | | | | |
| (1₄) Cl⁻ | 10 | 0 | 0 | --- | 0 | 2 |
| (3₃) COOH—CH=CH—COO⁻ | 10 | 0 | 0 | 2 | 0 | 2 |
| (4₃) COO⁻—CHOH—CHOH—COOH | 10 | 0 | 0 | 2 | 0 | 2 |

3,711,502

TABLE 5—Continued

| Active compound | Concentration of active compound in p.p.m. | Piricularia oryzae | Philaophora cinerescens | Fungi Pellicularia sasakii | Cercospora musae | Cochliobus miyabeanus |
|---|---|---|---|---|---|---|
| (5₃) CH₂—CO₂H \| HO—C—CO₂⊖ \| CH₂—CO₂H | 10 | 0 | 0 | 2 | 0 | 1 |
| (6₃) CH₃CO₂⊖ | 10 | 0 | 0 | 3 | 0 | 2 |
| (7₃) [phenyl with —OH and —CO₂⊖] | 10 | 0 | 0 | 3 | 0 | 2 |

The process for producing the particular new compounds of the present invention is illustrated, without limitation, by the following further examples:

EXAMPLE 6

N-triphenylmethyl-imidazolium lactate (2₃)

31 g. N-trityl-imidazole are dissolved in acetonitrile by heating; 10 g. (0.11 mol) d, l-lactic acid are then added. The residue after the solvent has been distilled off is made to crystallize by covering with a layer of ether; the crystalline product is washed with ether and dried.

Yield: 40 g. of colorless crystalline powder of M.P. 170–180° C.

EXAMPLE 7

N-triphenylmethyl-imidazolium chloride (1₄)

31 g. N-trityl-imidazole are dissolved in 400 ml. carbon tetrachloride, and hydrogen chloride is then introduced at room temperature. The hydrochloride precipitates after some time and is filtered off with suction. It is recrystallized from acetone/ether (1:1).

Yield: 33 g. of colorless crystals of M.P. 141° C.

EXAMPLE 8

1-[(p-chlorophenyl)-(bisphenyl)-methyl]-imidazolium chloride (19₁)

20 g. 1-[(p-chlorophenyl)-(bisphenyl)-methyl]-imidazole are dissolved in 250 ml. carbon tetrachloride. Hydrogen chloride is introduced at room temperature until about 1.5 equivalents of hydrogen chloride are taken up. The hydrochloride precipitates and, after being left to stand for two hours, is filtered off with suction, washed with carbon tetrachloride and dried.

Yield: 22 g. of colorless crystalline powder of M.P. 128–130° C.

In analogous manner, the following compounds according to Formula I are prepared:

| | Y | R | M.P., °C. |
|---|---|---|---|
| (4₄) | OH OH \| \| HO₂C—CH—CH—CO₂⊖ | H | 174–180 |
| (5₄) | CH₂CO₂H \| HO—C—CO₂⊖ \| CH₂CO₂H | H | 138–145 |
| (6₄) | CH₃CO₂⊖ | H | 231 |
| (3₄₋c) | CO₂H \| CH ‖ (cis) CH \| CO₂⊖ | H | 106–117 |

TABLE—Continued

| | Y | R | M.P., °C. |
|---|---|---|---|
| (7₄) | [phenyl with —OH and —CO₂⊖] | H | 160–168 |
| (8₃) | CH₃ \| CH ‖ CH \| CH=CH—CO₂⊖ | H | 158–160 |
| (9₃) | CO₂H \| CH₂ \| CH₂ \| CO₂⊖ | H | 188–189 |
| (3₄₋t) | CO₂H \| CH ‖ (trans) CH \| CO₂⊖ | H | 200–206 |

EXAMPLE 9

The following compounds were prepared in analogous manner.

| | Y | R | M.P., °C. |
|---|---|---|---|
| (10₂) | Cl⊖ | o-Cl | 159 |
| (11₃) | CH₃ \| CHOH \| CO₂⊖ | o-F | 120 |
| (12₃) | CH₃ \| CHOH \| CO₂⊖ | m-F | 110 |
| (13₂) | Cl⊖ | p-F | 110 |
| (14₃) | CH₃ \| CHOH \| CO₂⊖ | p-F | 95 |
| (15₂) | [phenyl with —OH and —CO₂⊖] | p-F | 80 |
| (16₃) | CH₃ \| CHOH \| CO₂⊖ | p-Cl | 90 |
| (17₂) | Cl⊖ | m-Cl | 153–155 |
| (18₃) | CH₃ \| CHOH \| CO₂⊖ | m-Cl | 80–90 |

PREPARATION OF STARTING MATERIALS

1-[(p-chlorophenyl)-(bisphenyl)-methyl]-imidazole

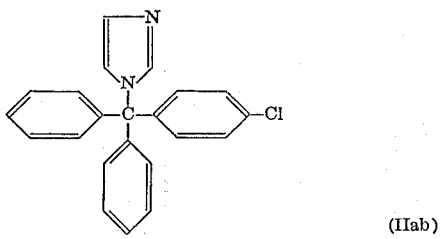

(IIab)

13.6 g. (0.2 mol) imidazole are dissolved in 200 ml. of dry acetonitrile, and a solution of 31.4 g. (0.1 mol) (p-chlorophenyl)-(bisphenyl)-methyl chloride in 50 ml. dimethyl formamide is added. Heating at 80° C. is effected for 3 hours, followed by clarification with activated charcoal, distillation of the solvent, and removal of the imidazole hydrochloride by digestion of the residue with water. After drying, recrystallization from light petroleum is effected.

Yield: 31 g. of colorless crystalline powder of M.P. 139–140° C.

Preparation of the (p - chlorophenyl) - (bisphenyl)-methyl chloride required as above starting material:

205 g. bromobenzene and 29 g. magnesium are reacted, in 1 liter of ether to give phenylmagnesium bromide and to this there are added dropwise 216 g. of p-chlorobenzophenone dissolved in 1 liter of benzene, and stirring is effected for 24 hours. Hydrolysis is then carried out with dilute hydrochloric acid, the solvent layer is taken off, and drying and distillation are then effected. 306 g. (p-chlorophenyl)-(bisphenyl)-carbinol are obtained. This is taken up in 1 liter of benzene, 50 g. calcium chloride are added and hydrogen chloride is introduced into the solution until saturation. The oily product obtained after removal of the solvent crystallizes after some time. By vigorous suction filtration, 220 g. (p-chlorophenyl)-bisphenyl)-methyl chloride of M.P. 88° C. are obtained.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. N-trityl-imidazolium salt of the formula:

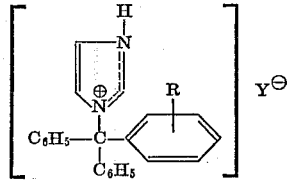

wherein
R is hydrogen and
$Y^\ominus$ is

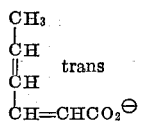 trans

References Cited

UNITED STATES PATENTS

| | | | |
|---|---|---|---|
| 3,299,090 | 1/1967 | Hoff | 260—309 |
| 3,321,366 | 5/1967 | Mussell et al. | 260—309 |
| 3,322,783 | 5/1967 | Dunn | 260—309.2 |
| 3,323,990 | 6/1967 | Budde et al. | 260—309 |
| 3,418,318 | 12/1968 | Lambie et al. | 260—309.2 |

OTHER REFERENCES

Chemical Abstracts, The Naming and Indexing of Chemical Compounds from Chemical Abstracts pages 26N–32 N, Wash. D.C., Amer. Chem. Soc., 1962.

Giesemann et al.: (I) Chem. Abstr. vol. 53, columns 10190–1 (1959).

Giesemann et al.: (II) Chem. Berichte vol. 92, pages 92–8 (1959).

Hofmann: Imidazole and its Derivatives Part I (vol. 6 The Chemistry of Heterocyclic Compounds), pages 13–15, New York, Interscience, 1953.

International Union of Pure and Applied Chemistry Jour. Amer. Chem. Soc. vol. 82, pages 5545–51 (1960).

Tolkmith et al.: Science vol. 158, pages 1462–3 (1967).

NATALIE TROUSOF, Primary Examiner

U.S. Cl. X.R.

260—389, 395; 424—273